(12) United States Patent
Noyce et al.

(10) Patent No.: US 7,552,014 B2
(45) Date of Patent: Jun. 23, 2009

(54) RADIOACTIVITY MONITORING APPARATUS

(75) Inventors: Paul Andrew Noyce, Poole (GB); Christopher Brian Palmer, Ferndown (GB)

(73) Assignee: Laboratory Impex Systems Limited, Poole (GB)

( * ) Notice: Subject to any disclaimer, the term of this patent is extended or adjusted under 35 U.S.C. 154(b) by 0 days.

(21) Appl. No.: 11/690,764

(22) Filed: Mar. 23, 2007

(65) Prior Publication Data

US 2007/0241285 A1 Oct. 18, 2007

(30) Foreign Application Priority Data

Mar. 25, 2006 (GB) ................... 0606026.3

(51) Int. Cl.
*G01T 1/16* (2006.01)
*G06F 19/00* (2006.01)
(52) U.S. Cl. ....................................... 702/32
(58) Field of Classification Search ............... 702/32
See application file for complete search history.

(56) References Cited

U.S. PATENT DOCUMENTS

| 3,221,166 | A |   | 11/1965 | Allenden |
| 3,670,164 | A |   | 6/1972  | Hardy et al. |
| 3,878,496 | A | * | 4/1975  | Erickson ............. 250/336.1 |
| 4,286,155 | A | * | 8/1981  | Utting .............. 250/336.1 |
| 4,818,884 | A | * | 4/1989  | Saubolle ............. 250/388 |
| 5,124,936 | A | * | 6/1992  | Pelletier et al. ...... 250/370.02 |
| 5,416,330 | A | * | 5/1995  | Abul-Faraj et al. ...... 250/395 |
| 2007/0273538 | A1 | * | 11/2007 | Holder .............. 340/600 |

FOREIGN PATENT DOCUMENTS

| EP | 0209351 | 1/1987 |
| GB | 2158572 | 11/1985 |

OTHER PUBLICATIONS

"Functional safety and IEC 61508, A basic guide," *IEC*, Nov. 2002, 1-11.

* cited by examiner

*Primary Examiner*—Michael P. Nghiem
*Assistant Examiner*—Cindy H Khuu
(74) *Attorney, Agent, or Firm*—Woodcock Washburn LLP (57) ABSTRACT

A radioactivity monitoring apparatus is disclosed, where the apparatus comprises signal processing means, and where the signal processing means is configured to determine a high count event when a detected radioactivity level is determined to be greater than a predetermined level. Furthermore, the signal processing means is further configured to determine an alarm condition when a plurality of consecutive high count events is determined.

8 Claims, 7 Drawing Sheets

RADIOACTIVITY MONITORING APPARATUS

PRIORITY INFORMATION

This application claims priority to United Kingdom Application No. 0606026.3, filed on Mar. 25, 2006.

FIELD OF THE INVENTION

The present invention relates to a monitoring apparatus for monitoring radioactivity.

BACKGROUND OF THE INVENTION

Accurate and reliable monitoring of radioactivity levels is an important part of working with or near to radioactive materials, and in particular, but not exclusively, in the nuclear industry. Moreover, there is an increasing demand for improved safety and increased product performance, including having monitoring apparatuses that may be required to be certified. For example, monitoring apparatus may be required to have a so-called Safety Integrity Level (SIL) in accordance with IEC61508. Thus, it would be desirable to provide an improved radioactivity monitoring apparatus fulfilling all these and any associated needs.

SUMMARY OF THE INVENTION

According to a first aspect of the invention there is provided a radioactivity monitoring apparatus comprising signal processing means, the signal processing means being configured to determine a high count event when a detected radioactivity level is determined to be greater than a predetermined level, and the signal processing means being further configured to determine an alarm condition when a plurality of consecutive high count events is determined.

Preferably the signal processing means comprises counter means which, in use, is operative to determine whether at least a threshold value of radioactive counts is detected within a predetermined time period.

The counter means may be configured to determine an high count event on the counter counting at least the threshold value before the predetermined time period has expired.

Preferably between three and ten consecutive high count events are required to determine an alarm condition and more preferably between four and eight consecutive high count events are required.

The signal processing means is preferably adapted to allow a user to set the predetermined time period. The signal processing means may be adapted to allow a user to set the threshold value of radioactive counts.

The counter means is preferably configured to be loaded with the threshold value and to be decremented on every received radioactive count.

The counter means may be configured to be reset to an initial value in the event that the predetermined time expires before at least the threshold value has been counted.

A highly preferred embodiment of the invention comprises a radioactivity monitoring apparatus comprising pulse counting means, wherein a pulse count value is configured to a predetermined over-count threshold level and in use when the over-count threshold is exceeded with a plurality of determined consecutive over-counts, the alarm condition is raised.

The pulse counting means may be viewed as providing a method of determining that the radioactive counts are valid within a predetermined time period.

An embodiment of the invention may be viewed as comprising the determination of a measure of count rate.

According to a second aspect on the invention there is provided a radioactivity monitoring system which comprises a primary monitoring system and a secondary monitoring system wherein the second monitoring system comprises the monitoring apparatus of the first aspect of the invention.

According to a third aspect of the invention there is provided a method of monitoring radioactivity comprising determining an high count event when a detected radioactivity level is determined to be greater than a predetermined level, and determining an alarm condition when a plurality of consecutive high count events is determined.

BRIEF DESCRIPTION OF THE DRAWINGS

Various embodiments of the invention will now be described, by way of example only, with reference to the accompanying drawings in which.

DETAILED DESCRIPTION OF ILLUSTRATIVE EMBODIMENTS

Figure 1:
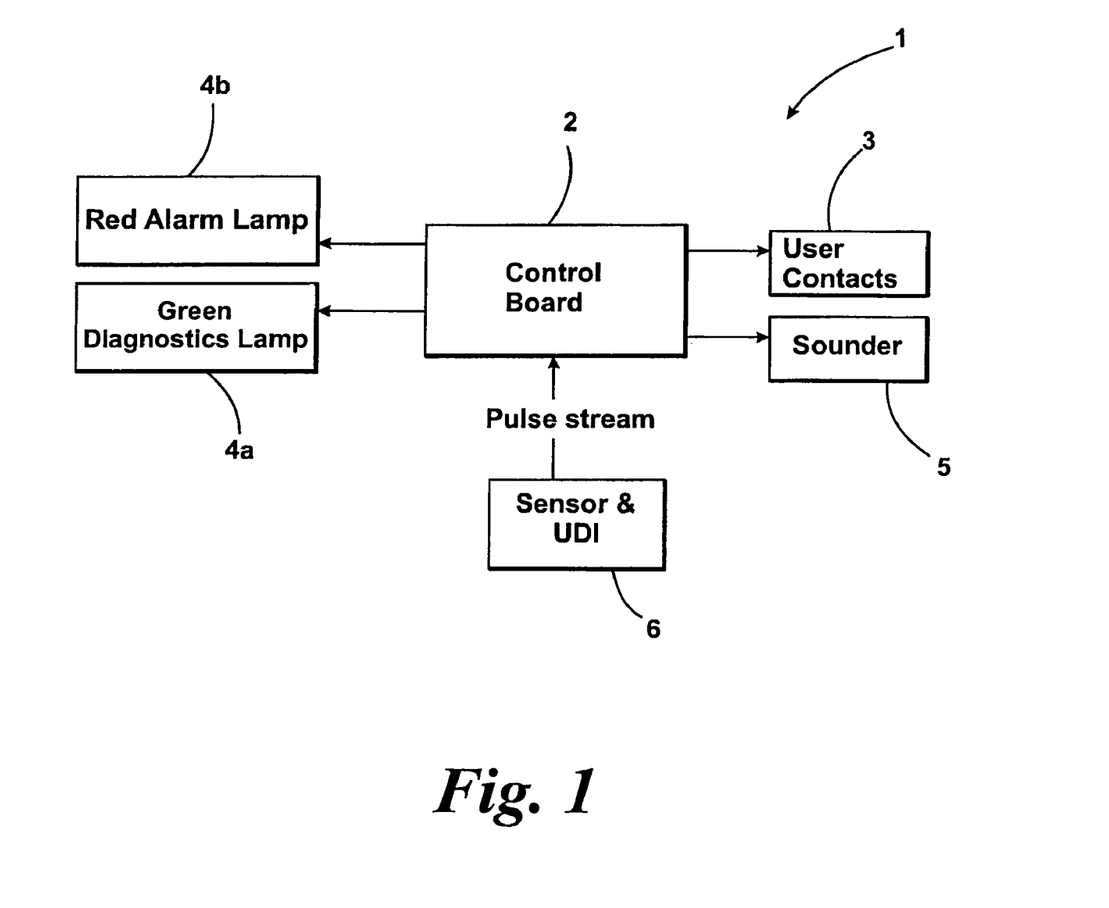
FIG. 1 is a block diagram of a radioactivity monitoring apparatus.

With reference to FIG. 1 there is shown a radioactivity monitoring apparatus 1 comprising a control assembly 2, a user interface (not shown), visible alarm means 4a and 4b, audible alarm means 5 and radioactivity detection means and digital pulse conversion means shown generally at 6. The user interface comprises visual display means (for example an LED display) to indicate a current status, diagnostic information and a count input signal. As will be described below the apparatus 1 is operative to raise an alarm status if elevated radioactive levels are detected.

Figure 2:
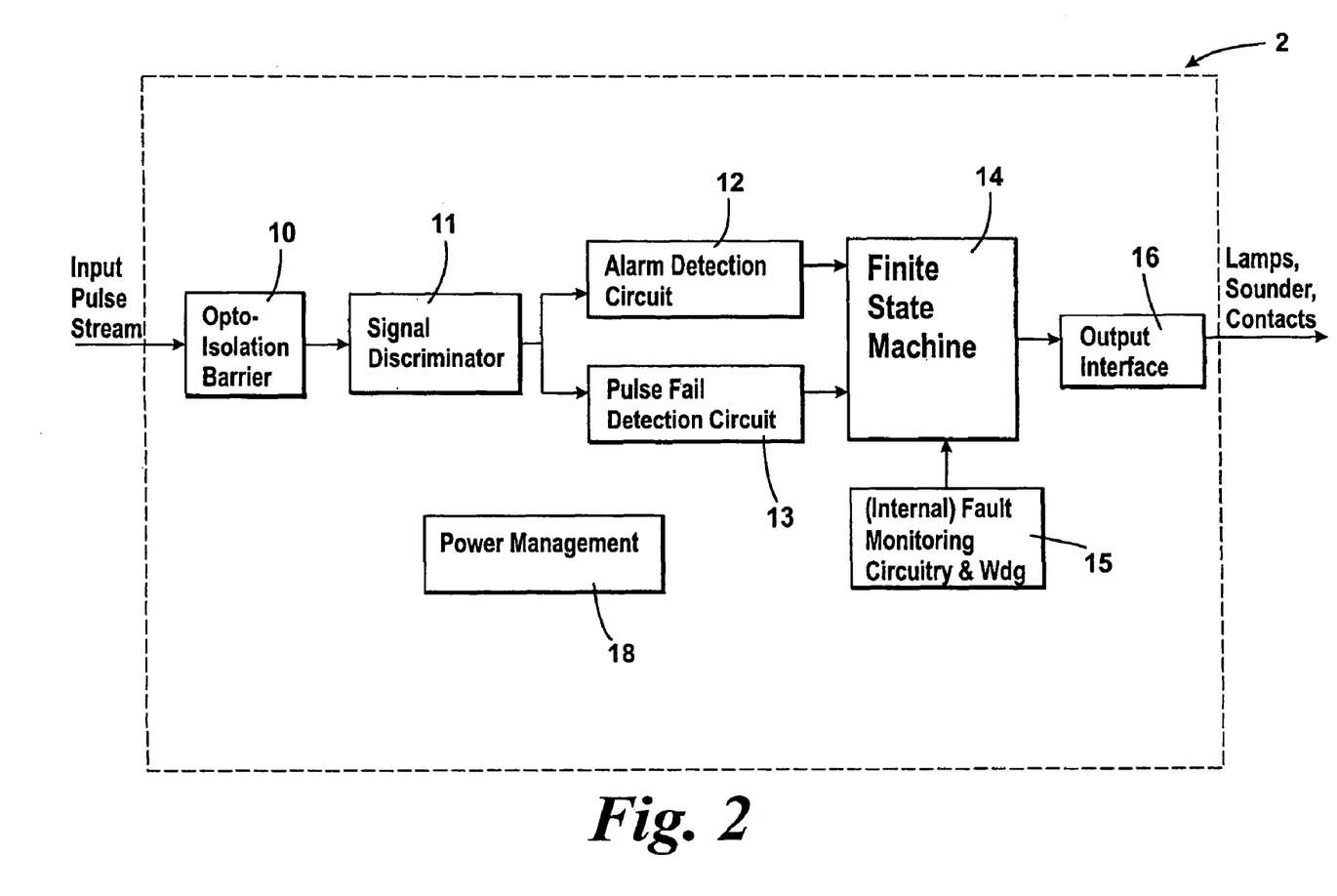
FIG. 2 is a block diagram of a control assembly of the apparatus of FIG. 1.

The various functional components of the control assembly 2, as shown in FIG. 2, will now be described. The primary functionality of the control assembly 2 is to determine an Alarm status and a Fail status (when there is no detected input pulse stream).

The radioactivity detection means may be of any suitable type, for example a Geiger Müller type. The digital pulse conversion means is operative to convert an output of the radioactivity detection means into a logic pulse train or a balanced signal input on the R5485 line. As shown in FIG. 1 a Universal Detector Interface (UDI) is used to read the signal from the radioactivity detection means and convert that into a pulse train.

An opto-isolation barrier 10 provides an interface of the input pulse stream to the control assembly 2. The isolation barrier 10 comprises opto-isolation, over voltage protection, input voltage spike protection (positive or negative) and external voltage offsets. The protection circuitry conditions the input pulse stream before the opto-isolation interface.

The control assembly 2 further comprises a signal discriminator 11 to ensure that any 'latch up' conditions in the input pulse stream are revealed. If the input pulse stream fails latched high or fails latched low, the discriminator 11 ensures that no-count failure circuitry 13 identifies the failure as a no-count timeout and raises the necessary Fail status.

Figure 4A:
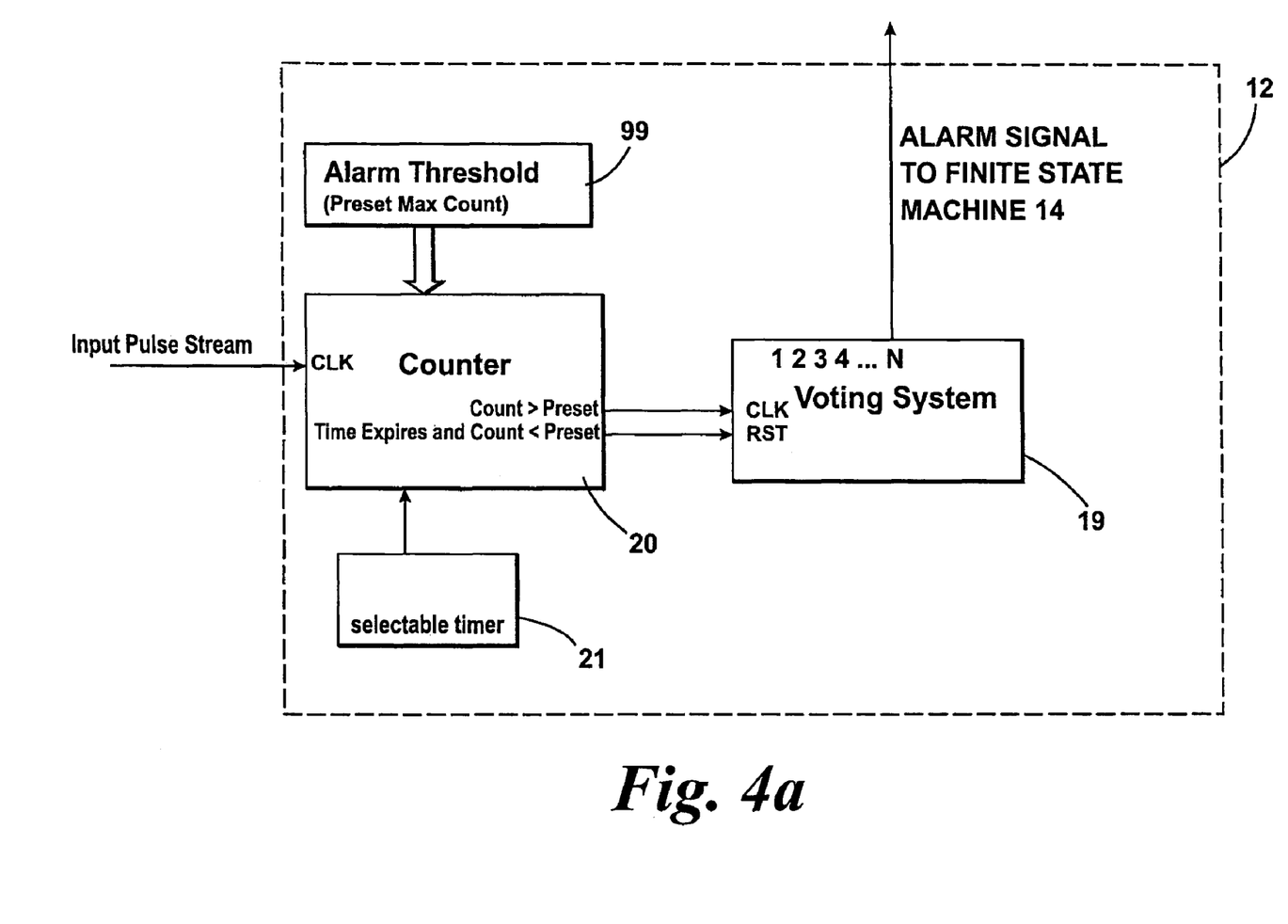
FIG. 4 is a block diagram representation of a counter arrangement of the Finite State Machine of FIG. 3.
Figure 5:
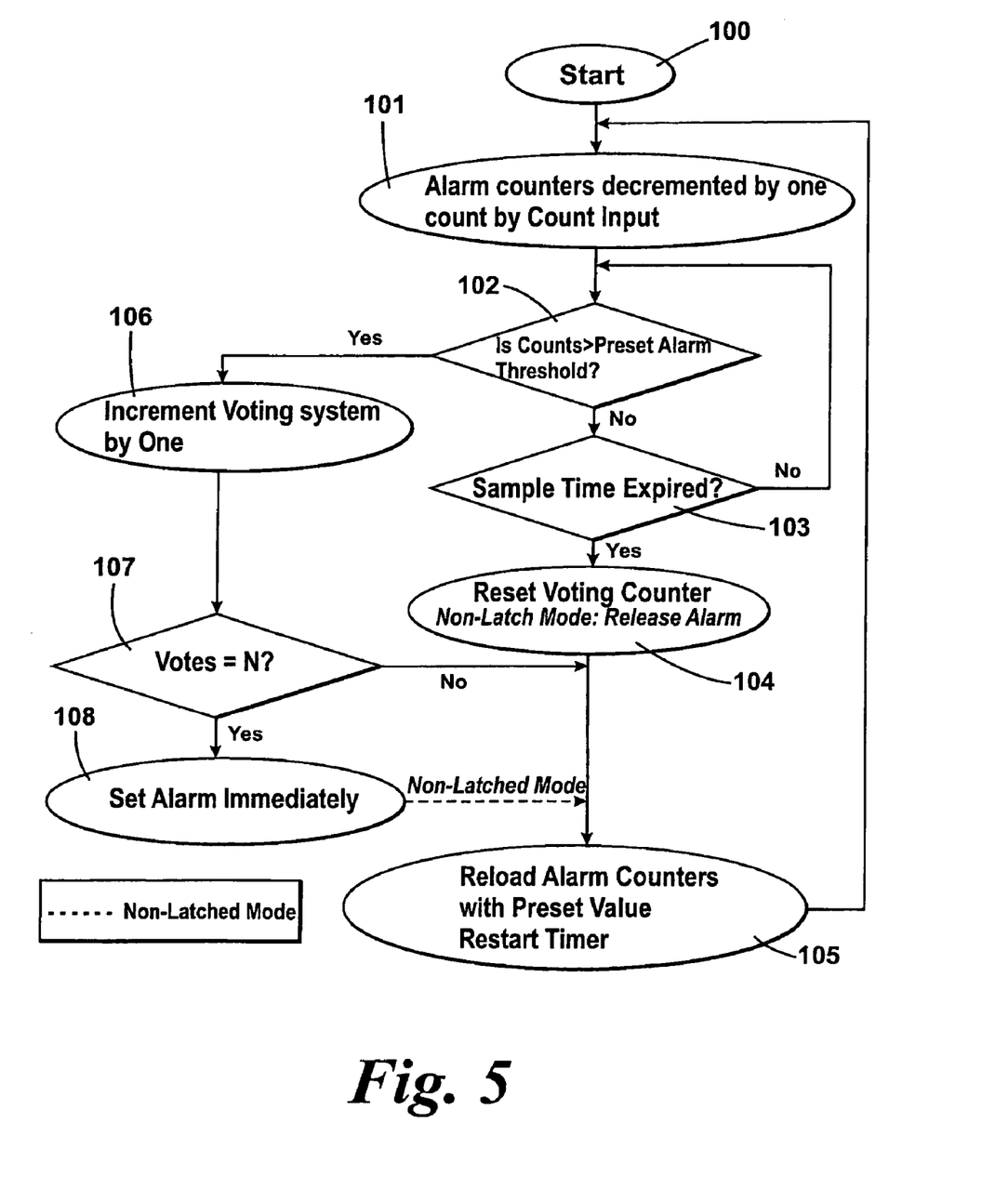
FIG. 5 is a flow diagram of the process steps implemented by the counter arrangement of FIG. 4.

An alarm detection circuit 12 (as best seen in FIG. 4a) is configured to determine an Alarm status if the input count is determined to be of an elevated level and has passed through a voting system 19. The circuit 12 comprises a 16-bit counter which is configured to be decremented on every count of the input pulse stream. If the counter has not been decremented to zero within a preset sample time (as determined by timer 21), the alarm counter is reloaded with a preset threshold value and the timer and voting system are reset. If the counter is decremented to zero within the sample time, an output of the counter 20 increments a counter of the voting system by one count, the timer is reset and the alarm counter 20 is reloaded. When the voting system count equals 'N' consecutive overcount periods, the voting system determines an alarm status and a signal is passed to the Finite State Machine 14. N is a user configurable value of 1, 3, 5 or 6. The various monitoring steps 100 to 108 are shown in the flow diagram of FIG. 5.

The timer 21 is programmable and allows the sample time periods to be set by the user by use of the user switches 99. For example, the following timing options may be available to the user:

Every half second (which can be doubled for Counts Per Second)

Range of 0.5 to 127.5 seconds (2.1 minutes) @ 0.5 second resolution

Range of 0.5 to 127.5 minutes (2.1 hrs) @ 30 second resolution

To gain good radiological statistics, the following votes (=over-count events) are made available for the user to select using mechanical DIP (Dual In-line Package) switches:

1 Vote
3 Votes
5 Votes
6 Votes (if neither of the previous votes are selected)

It is to be noted that although the user can select that only one over-count event is required to raise the alarm status, it is highly preferred that, in use, multiple consecutive over-count events are required to raise the Alarm status.

Advantageously by requiring that multiple consecutive over-count events are required to raise the Alarm status the probability of false alarms is significantly reduced.

Figure 4B:
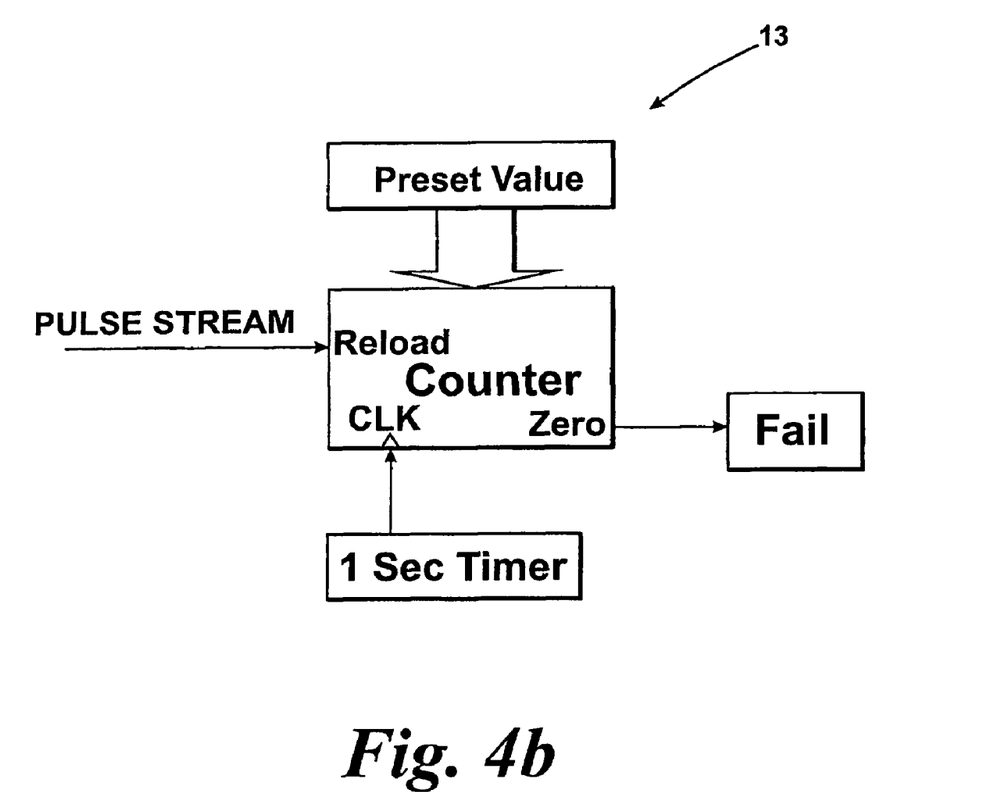

A no-count Fail condition is raised if there is no signal received from the output of the pulse discriminator 11 after a preset time has elapsed. As shown in FIG. 4b a pulse failure detection circuit 13 comprises a 16-bit counter which in use is decremented every second and reloads with a preset value on every received count. When the preset time has elapsed with no counts having been received, the counter reaches zero and the Fail status shall be raised.

Figure 3:
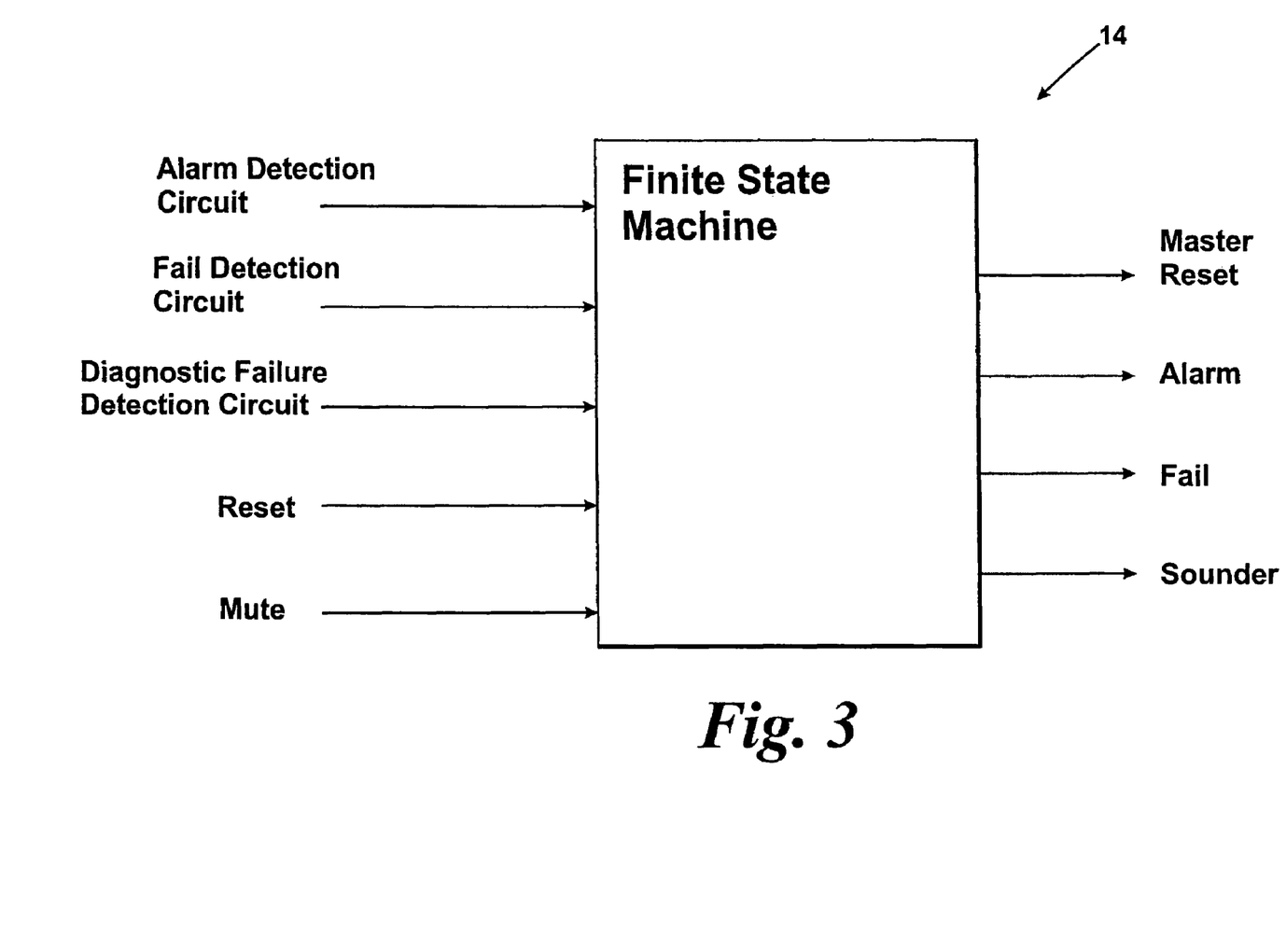
FIG. 3 is a block diagram of a Finite State Machine of the control assembly of FIG. 2.

The output of the alarm detection circuitry 12, fail detection circuitry 13 and fault monitoring circuitry 15 are fed into the Finite State Machine 14 and particular reference is now made to FIG. 3 in that regard. The state machine 14 employs the Mealy synchronous model (to eliminate any race conditions) which processes the inputs into four output control signals. These output control signals directly control the lamps 4a and 4b (red and green), the sounder and global master reset. The output relay contacts (not shown) are driven from these signals.

The Reset input signal is fed either from the external reset input (external hardware such as key switch operation) or from an on-board reset push button. The Mute input control causes the Finite State Machine 14 to silence the sounder 5 when the sounder is active.

The fault monitoring circuitry 15 provides monitoring circuitry to detect faults on key areas of the control assembly 2. The fault monitoring circuitry operates in continuous real time. If any faults are diagnosed, a fault flag signal is fed into the Finite State Machine 14, where the output state is raised as appropriate.

The Watchdog provides continuous diagnostic monitoring for the main crystal clock (not illustrated) of the control assembly 2 and the alarm circuitry 12.

The Watchdog continuously monitors the crystal clock on the slowest frequency after the crystal clock is divided down. If the clock signal to the Watchdog fails for a duration of typically 2 seconds, then the watchdog raises a watchdog fail status.

The Watchdog also monitors the alarm timer DIP switch value and monitors for activity from the alarm circuitry 12. If there is no detected activity within the time period of the alarm timer value, the watchdog shall raise a watchdog fault (fail) status. The control assembly 2 will remain in this status until either power down or the reset button pressed (link selectable).

Power management circuitry 18 controls all the power requirements for the control assembly 2 and essentially comprises two sub-assemblies:

Power supply interface to the DC power supply

Battery power supply interface (the battery providing a backup power supply and being trickle charged by the mains power supply)

The power supply interface to the DC input provides the following protection:

At least a first order filter to help reduce effects of noise on the power supply Reverse power supply protection Over voltage protection The battery power supply interface contains the following circuit features Automatic switch over on power supply loss Lead acid battery trickle charge circuitry Fuse on battery positive Reverse battery protection Output interface 16 comprises relay contacts (not illustrated). The outputs are considered as the lamps 4a and 4b, the sounder 5 and the user contacts. The user contacts are volt free user configurable either as normally open, closing on a raise of status or normally closed contacts which open on the event of a raise in status. The alarm lamp relay contacts and alarm user contacts are monitored with continuous diagnostic coverage. Any change between the demanded relay status and actual relay status raises a Fail status.

The following risk reduction measures are employed by the control assembly 2.

1. Continuous monitoring of the status of the alarm output relays. If there is a difference between expect relay response and actual relay response, then the Fail status is raised.
2. If the crystal fails, the Fail status is raised.
3. The alarm lamp 4b is monitored. If the alarm lamp is removed or open circuit, the Fail status is raised.
4. If there is a loss in the mains power supply to the control assembly, the Fail status is raised.
5. The battery fuse (not illustrated) is monitored during normal charging. If the fuse blows, the Fail status is raised.
6. The battery voltage is monitored. If the battery voltage falls below a voltage threshold, the Fail status is raised.

7. The battery is protected against reverse connection.
8. The alarm circuitry 12 is monitored for activity. If there is no activity (counter reset signals, or over count threshold signal) after the expected expiry time of the timer (read from the timer DIP switch), then the Fail status is raised.
9. The input reset is edge-triggered, such that a continuous input reset signal does not prevent an Alarm condition or Fail status being raised.
10. There is an additional PC tool (not illustrated) to aid the user to provide a visual indication of how the DIP switches of the control assembly are to be configured, given valid data entry.
11. There is a visible indication in the form of a LED display which has intermittent flashing indicia to indicate counts present.

In use a Normal status is defined as the red lamp 4b OFF, green lamp 4a static ON and the sounder OFF. The user contacts can be configured as normally closed or normally open on Alarm condition or Fail status, this is dependant on any subsystem the user is installing the control assembly 2 into. However, it is usually preferred and conventional practice that these are configured to use the normally closed contact pair. The Normal status shall be the steady state condition under normal circumstances (input counts less than alarm threshold and with greater counts than the no-count period). From steady state, an Alarm status or Fail status can be raised.

An Alarm status is defined as the red lamp 4b ON and the sounder 5 activated (although the sounder can be muted by the user without altering the Alarm status) and the alarm relay contacts relaxed.

The Alarm condition shall be raised by any of the following conditions:
1. Input pulse stream count greater than alarm preset value for N consecutive voting samples
2. If the link 'Force Alarm on Fail' is set and the control assembly 2 raises a Fail status.
3. Alarm Status raised for a predetermined duration of one second during reset, if 'Relays drop on Reset' link is set
4. 'Test Alarm' input activated When a Fail status is raised, the green diagnostics lamp 4a is caused to either flash or be extinguished. The green lamp is extinguished only if either the watchdog is raised or total power loss including battery failure. The sounder 5 either bleeps with the green lamp, if 'Sounder on Alarm and Fail' link is made, or remains OFF if the link is not made. On total power failure, including battery, all user relay contacts are relaxed into Alarm condition and Fail status.

The Fail status is raised by any one of the following conditions:

Controlled Conditions
1. No input pulse stream
2. Status raised for a predetermined time during reset if 'Relays drop on Reset' link is set
3. 'Test Fail' input activated
4. External fail input set On-Board Diagnostics
1. Alarm relay contacts not responding to required alarm control signal (faulty or sticky alarm relays)
2. Watchdog failure (faulty crystal or no activity in alarm circuitry)
3. Alarm lamp disconnected or blown open circuit
4. Mains power loss
5. Battery fuse blown
6. Low battery voltage The functions which are controlled by link settings are now described.

The link 'Relay Drops on Reset' controls the power up sequence. Upon reset condition (either external reset, switch reset (link dependable) or power up), if this link is clear, the control assembly 2 powers up into 'Normal' operation. If the link is set, all the relays shall drop to their relaxed condition, the Alarm condition is raised for a predetermined time, then the system enters into Normal operating mode.

The link 'Latching Alarm and Fail Status' configures the response of the system after a fail or alarm status is raised. If the link is set to 'Latched', then after a status is raised, the only method of clearing that status is Reset. For non latched setting, the status is removed after the status has been removed.

The link 'Sounder on Fail and Alarm' configures the action of the sounders during Alarm condition and Fail status. This is given below:

| Status | Cause | Sounder | Link |
|---|---|---|---|
| Alarm | Trip | Continuously On (unless muted) | Don't Care |
| Fail | Fault or No-Count | Sounder Bleeps | Set to 'On' |
| Fail | Fault or No-Count | No Sounder | Set to Off |
| Fail | Total Power Loss | Sounder Continuously | Don't Care |
| Fail | Watchdog | Sounder Continuously | Don't Care |
| Fail & Alarm | | Fail followed by Sounder Continuously | Don't Care |
| Alarm | (unless muted) | | |

When the link 'Force Alarm on Fail' is set, then the Fail status shall automatically raise the Alarm condition in addition.

In a highly preferred embodiment the control assembly 2 is embodiment is a single (Eurocard) PCB board system. In a stand alone embodiment (ie one in which there is no redundant system) the control assembly 2 has its own power supply unit, power backup, input control buttons and output peripherals.

The above discussed embodiment is in the form of hardware only and comprises no software. Alternative embodiments however may be realised using software only or a combination of software and hardware.

Figure 6:
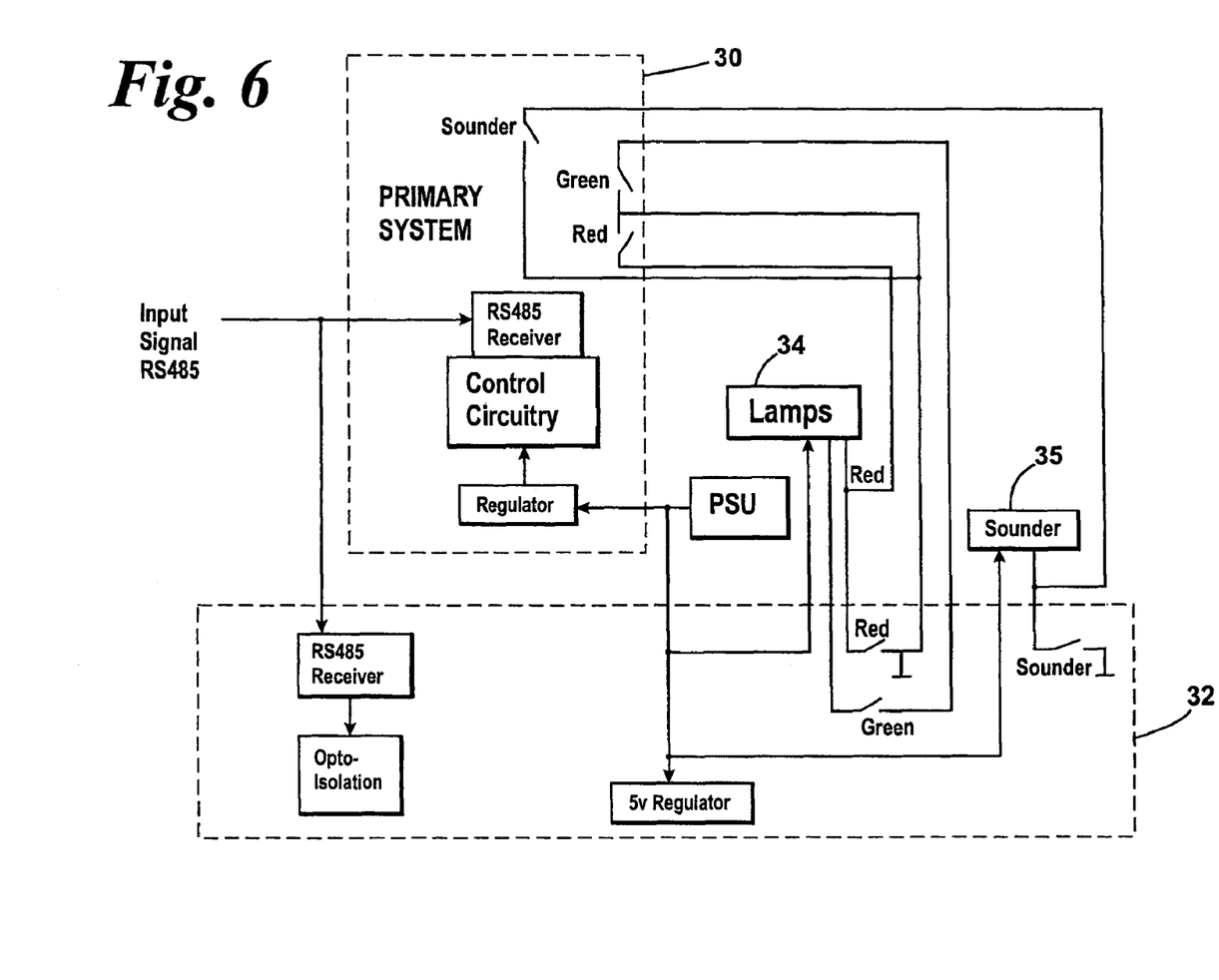
FIG. 6 is a block diagram of an integrated monitoring system which comprises the control assembly of FIG. 2.

The control assembly 2 can, however, also be used for integrated applications where the assembly provides a redundant system 32 to monitor the operation of a primary system 30, as shown for example in FIG. 6. The RS485 pulse stream count input is split at the front end, with one signal pair connected to the primary system and the second signal pair connected to the control assembly. The outputs of the red and green lamps 34 and sounder 35 are isolated from the primary system 30, to provide a simple interface into the control assembly 32. This isolation between the primary system output and the secondary control assembly 32 output provides means of separating safety functions from non-safety functions and maintaining the secondary control assembly power supply control over the peripherals 34 and 35. The primary system 30 does not have priority over the secondary control assembly and does not suppress a raise in status if the assembly has an Alarm status or Fail status. Both systems are required to be in normal mode without a Fault condition for the green lamp to be static on.

In use the peripherals 34 and 35 are driven by the secondary assembly 32 such that on the event of power failure, the secondary assembly battery backup powers them. The secondary control assembly 32 contains a fuse in series with its power supply to protect against short circuit and over voltage. The power supply unit (PSU) between the primary system 30 and the secondary control assembly is usually shared but depending on system build and integration may be separate power supplies. However the charging and maintenance of the respective backup batteries are controlled by each system. In such an integrated environment the primary system or the secondary control system is capable of raising an Alarm status or a Fail status, but neither system is permitted to drop an Alarm status or a Fail status (to normal status) unless both systems agree.

What is claimed:

1. A radioactivity monitoring apparatus comprising:
a signal processor configured to determine a high count event when a detected radioactivity level is determined to be greater than a predetermined level, and further configured to determine an alarm condition when a plurality of consecutive high count events is determined, the signal processor comprising a counter configured to determine whether at least a threshold value of radioactive counts is detected within a predetermined time period, the counter configured to be loaded with the threshold value and to be decremented on every received radioactive count, and the counter configured to determine a high count event on the counter counting at least the threshold value before the predetermined time period has expired, and in that event the counter configured to reload to an initial value and commence counting in respect of a consecutive time period.

2. The apparatus according to claim 1, wherein between three and ten consecutive high count events are required to determine the alarm condition.

3. The apparatus according to claim 1, wherein between four and eight consecutive high count events are required to determine the alarm condition.

4. The apparatus according to claim 1, wherein the signal processor is adapted to allow a user to set the predetermined time period.

5. The apparatus according to claim 1, wherein the signal processor is adapted to allow a user to set the threshold value of radioactive counts.

6. The apparatus according to claim 1, wherein the counter is configured to be reset to an initial value in the event that the predetermined time expires before at least the threshold value has been counted.

7. A radioactivity monitoring system which comprises a primary monitoring system and a secondary monitoring system, wherein the secondary monitoring system comprises the radioactivity monitoring apparatus of claim 1.

8. A method of monitoring radioactivity comprising:
determining a high count event when a detected radioactivity level is determined to be greater than a predetermined level,
determining an alarm condition when a plurality of consecutive high count events is determined;
determining whether at least a threshold value of radioactive counts is detected within a predetermined time period by decrementing a counter loaded with the threshold value on every received count; and
determining a high count event when at least the threshold value is counted before the predetermined time period has expired, and in that event commencing counting in respect of a consecutive time period from an initial value.

* * * * *